United States Patent
Francis, Jr.

[11] Patent Number: 5,674,064
[45] Date of Patent: Oct. 7, 1997

[54] COMBUSTION USING ARGON WITH OXYGEN

[75] Inventor: Arthur Wellington Francis, Jr., Monroe, N.Y.

[73] Assignee: Praxair Technology, Inc., Danbury, Conn.

[21] Appl. No.: 350,150

[22] Filed: Nov. 29, 1994

Related U.S. Application Data

[63] Continuation-in-part of Ser. No. 113,038, Aug. 31, 1993, abandoned.

[51] Int. Cl.[6] ............................................. F23J 1/00
[52] U.S. Cl. ........................................ 431/4; 431/8; 431/12
[58] Field of Search .................................. 431/2, 9, 10, 4, 431/5, 8, 181, 187, 190; 110/346

[56] References Cited

U.S. PATENT DOCUMENTS

| | | | |
|---|---|---|---|
| 3,905,745 | 9/1975 | Konda | 431/2 |
| 4,378,205 | 3/1983 | Anderson | 431/5 |
| 4,533,314 | 8/1985 | Herberling | 431/4 |
| 4,541,796 | 9/1985 | Anderson | 431/187 |
| 4,863,371 | 9/1989 | Ho | 431/9 |
| 4,878,829 | 11/1989 | Anderson | 431/8 |
| 4,907,961 | 3/1990 | Anderson | 431/8 |
| 4,946,382 | 8/1990 | Kobayashi et al. | 431/8 |
| 4,957,050 | 9/1990 | Ho | 110/346 |
| 4,973,346 | 11/1990 | Kobayashi | 65/135 |
| 4,988,285 | 1/1991 | Delano | 431/5 |
| 5,000,102 | 3/1991 | Ho | 110/346 |
| 5,076,779 | 12/1991 | Kobayashi | 431/5 |
| 5,100,313 | 3/1992 | Anderson et al. | 431/8 |
| 5,102,330 | 4/1992 | Ho | 432/143 |
| 5,176,086 | 1/1993 | Clark et al. | 110/346 |
| 5,186,617 | 2/1993 | Ho | 431/9 |
| 5,213,492 | 5/1993 | Ho | 431/10 |

OTHER PUBLICATIONS

Delano, M.A., et al.; Evaluation of Advanced PSA and Oxygen Combustion System For Industrial Furnace Applications, IETC, Sep. 14, 1988.

Primary Examiner—James C. Yeung
Attorney, Agent, or Firm—Stanley Ktorides

[57] ABSTRACT

A combustion method wherein fuel is mixed with an oxidant mixture comprising a defined concentration of argon and nitrogen and combusted resulting in reduced generation of particulate pollutants. The argon increases the mass and the nitrogen increases the volume of the oxidant improving the combustion reaction. Alternatively argon is mixed with fuel and the resulting mixture subsequently mixed with oxidant for combustion.

12 Claims, 1 Drawing Sheet

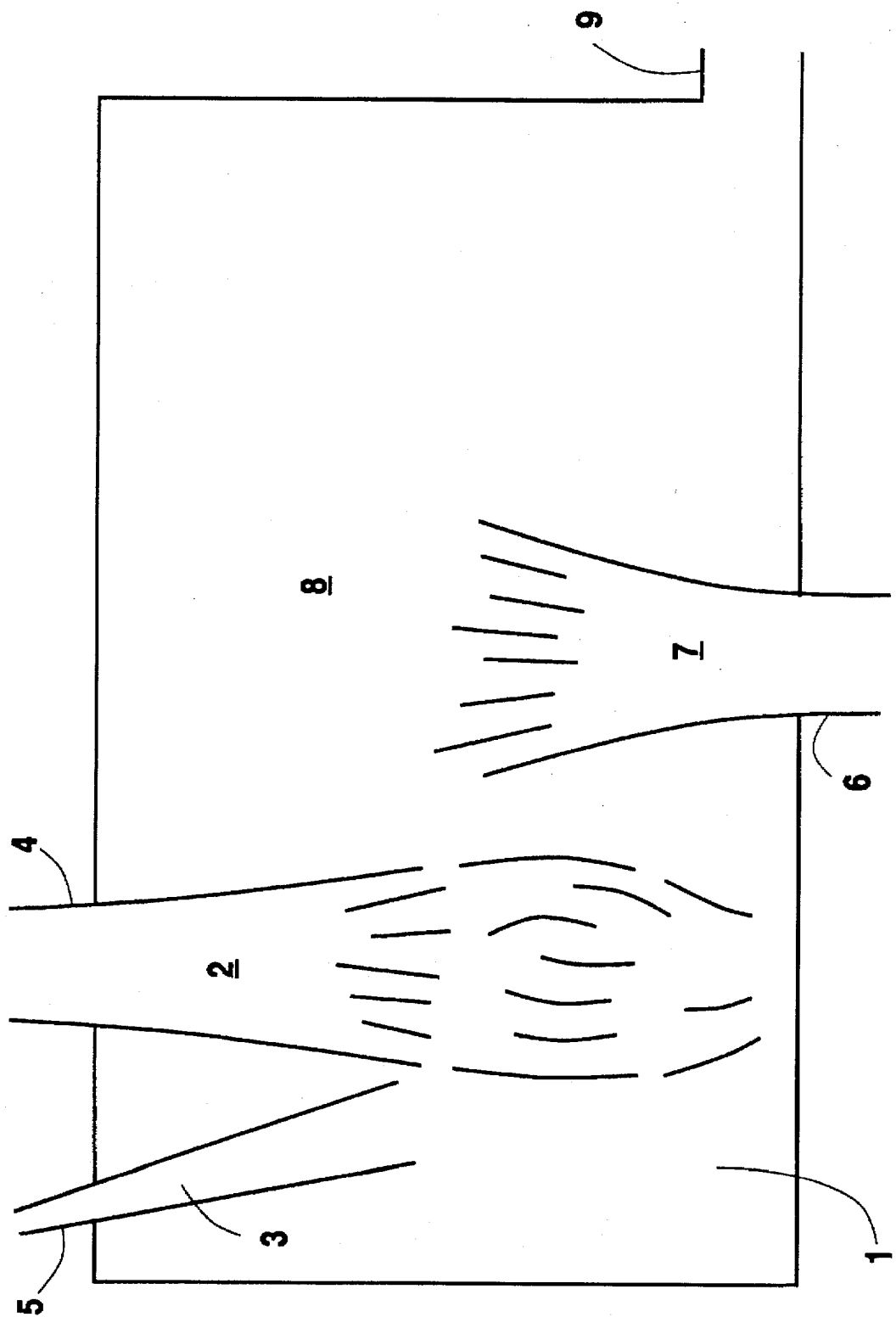

COMBUSTION USING ARGON WITH OXYGEN

This application is a continuation-in-part of U.S. patent application Ser. No. 08/113,038, filed Aug. 31, 1993, abandoned.

Technical Field

This invention relates generally to combustion carried out in a combustion zone such as an industrial furnace in order to generate heat which may be used to heat a furnace charge.

Background Art

Many industrial processes employ furnaces wherein fuel and oxidant are combusted to generate heat which is used to heat a charge within the furnace. Among such industrial processes one can name glassmaking wherein the charge is glassmaking materials or molten or solid glass, steelmaking wherein the charge is steel or iron, copper smelting wherein the charge is raw copper and aluminum making wherein the charge is raw aluminum.

Heretofore in carrying out such combustion the oxidant employed has been air due primarily to the lower cost and ready availability of air for this use. As is known, air comprises nearly 80 percent nitrogen. The use of air as the oxidant in carrying out combustion may also result in the generation of nitrogen oxides (NOx) which are considered significant pollutants. Accordingly there has arisen a need in recent years to reduce the level of NOx generated by industrial combustion processes.

One successful method for carrying out combustion such as industrial furnace combustion is to use pure oxygen as the oxidant for the combustion. This eliminates a large amount of the nitrogen molecules that might otherwise be available from the combustion reaction and thus significantly reduces the amount of NOx generated on an equivalent heat generation basis.

One problem with combustion carried out with pure oxygen as the oxidant is a reduction in the momentum of the flame or combustion reaction within the industrial furnace. Combustion reaction momentum is important for ensuring the distribution of the heat generated by the combustion reaction throughout the furnace or combustion zone. This is especially the case where the furnace contains a charge which is intended for heating. As is known, momentum is the product of mass and velocity. The reduction in the momentum of a combustion reaction wherein pure oxygen is the oxidant from that of a combustion reaction wherein air is the oxidant results from the fact that an oxidant of pure oxygen contains only about one-fifth of the mass of an oxidant of air on an equivalent oxygen molecule basis.

The problem of low combustion reaction momentum with an oxidant of pure oxygen has been successfully addressed by injecting the oxidant into the combustion zone at a high velocity. The high velocity compensates for the reduced mass to maintain the momentum at the desired level. Moreover, the high oxidant velocity creates an aspiration effect wherein furnace gases such as carbon dioxide and water vapor, are aspirated into the high velocity oxidant prior to the mixing of the oxidant with the fuel and the subsequent combustion. This increases the mass of the oxidant fluid and improves the combustion reaction. This significant improvement in the combustion field is disclosed and claimed in U.S. Pat. No. 4,378,205—Anderson and U.S. Pat. No. 4,541,796—Anderson.

High velocity oxygen injection, though solving the significant NOx problem of industrial furnaces, is not problem-free. Especially in the case where the furnace contains a charge which may generate significant particulates, such as in the case of glassmaking, the high velocity causes an increased level of particulates to be generated from, for example, the charge, and carried out of the furnace. This increases the level of particulate emissions of the industrial process and generally requires the addition of costly pollution control equipment to alleviate the problem.

Accordingly it is an object of this invention to provide a combustion method which can effectively overcome both the NOx and the particulate pollutant problems discussed above.

SUMMARY OF THE INVENTION

The above and other objects which will become apparent to one skilled in the art upon a reading of this disclosure are attained by the present invention which is:

A method for carrying out combustion comprising:
(A) providing fuel into a combustion zone;
(B) providing oxidant mixture into the combustion zone at a low velocity, said oxidant mixture comprising from 28 to 96 volume percent oxygen, from 2 to 70 volume percent argon and from 2 to 60 volume percent nitrogen;
(C) mixing said fuel and said oxidant mixture within the combustion zone; and
(D) combusting said fuel with said oxygen within the combustion zone.

BRIEF DESCRIPTION OF THE DRAWING

The sole FIGURE is a stylized, simplified plan view representation of one embodiment of the invention as it might be practiced in conjunction with a cross-fired glass-melting furnace.

DETAILED DESCRIPTION

In the practice of this invention oxidant mixture and fuel are provided into a furnace or combustion zone. The oxidant mixture and fuel may be injected separately into the furnace such as through separate pieces of injection equipment or through a post-mixed burner. The oxidant mixture and fuel may be injected together into the furnace such as through a pre-mixed burner or from a cavity in the furnace wall. The invention may be practiced in conjunction with any type of furnace. The invention will have particular utility in the operation of an industrial furnace which contains a charge which is intended to be heated and/or melted, particularly a charge which may generate significant levels of particulate emissions. Specific examples of such furnaces include glass-melting furnaces, steel reheating furnaces, copper smelting furnaces and aluminum production furnaces. The fuel may be any fluid fuel such as methane, propane, natural gas or fuel oil.

The oxidant mixture comprises oxygen, argon and nitrogen. Argon is present in the oxidant mixture in a concentration within the range of from 2 to 70 volume percent, preferably within the range of from 3 to 20 volume percent, most preferably within the range of from 3 to 10 volume percent. Nitrogen is present in the oxidant mixture in a concentration within the range of from 2 to 60 volume percent, preferably within the range of from 3 to 10 volume percent. The nitrogen economically adds volume to the oxidant mixture improving the efficiency of the combustion reaction. Oxygen is present in the oxidant mixture in a concentration within the range of from 28 to 96 volume percent, preferably within the range of from 80–95 volume percent, most preferable within the range of from 85–93 volume percent. The oxidant mixture, in addition to oxygen, argon and nitrogen may comprise other elements or compounds such as carbon dioxide and water vapor.

The oxidant mixture may be made up in any suitable and effective way. One preferred method for generating the oxidant mixture useful in the practice of this invention is to mix argon and nitrogen with technically pure oxygen, i.e. a fluid having an oxygen concentration of at least 99.5 mole percent. The oxygen, argon and nitrogen may be taken from cylinders or from cryogenic liquid tanks. Another preferred way for generating the oxidant mixture useful in the practice of this invention is to pass air through a membrane separation system or a pressure swing adsorption separation system and to operate such system in a manner so as to remove some of the nitrogen from the air. A particularly preferred pressure swing adsorption system is a vacuum pressure swing adsorption system. Those skilled in the art of air separation are familiar with these terms and with their meanings.

As previously mentioned, the oxidant mixture may be provided into the furnace separately from the fuel or in a mixture with the fuel. The oxidant mixture and fuel mix within the combustion zone and combust within the combustion zone to generate heat. When the oxidant mixture and the fuel are provided together in a mixture into the furnace or combustion zone, they further mix within the combustion zone; they may already be combusting as they are being provided together into the combustion zone.

The use of the defined oxidant mixture solves the particulate problem heretofore experienced in industrial combustion. As is the case with combustion using technically pure oxygen, NOx generation is reduced with the practice of the invention over that resulting from air combustion because less nitrogen is brought to the combustion reaction with the oxidant mixture. However, because the molecular weight and the density or specific gravity of argon significantly exceeds that of oxygen, the oxidant mixture of this invention has a mass which is significantly greater than would be the case with a pure oxygen oxidant. This increased mass enables one to inject the oxidant mixture into the combustion zone at a lower velocity than would otherwise be the case and still achieve good combustion reaction momentum. Generally the oxidant mixture is provided into the combustion zone at a velocity within the range of from 25 to 1000 feet per second (fps), preferably within the range of from 25 to 425 fps, most preferably within the range of from 25 to 325 fps. Moreover, the increased mass of the oxidant coupled with the increased volume due to the nitrogen component, may serve to improve the degree of mixing between the oxidant mixture and the fuel, enabling more complete combustion than might otherwise be the case and reducing the level of products of incomplete combustion, such as carbon monoxide and hydrocarbons, released to the atmosphere. As an added benefit, since argon is an inert gas, deleterious reactions within the flame or combustion reaction, or with the charge if a charge is present in the furnace, are avoided. Still further, the inert argon acts as a heat sink to adsorb some of the heat of the combustion reaction. Since NOx formation is kinetically favored by high reaction temperatures, this further reduces NOx formation such as from infiltrating air or fuel nitrogen, over that which would be generated by combustion with pure oxygen as the oxidant.

In a preferred mode of operation, the minimum oxidant mixture velocity necessary for carrying out the invention may be calculated using the following equation:

$$V_{min} = 50 fps \times 100/(100 + 1.25A)$$

where A is the concentration of argon in the oxidant mixture.

The FIGURE is a stylized representation of a furnace intended to illustrate different modes of operation of the invention. Referring now to the FIGURE, there is shown furnace 1 wherein a fuel stream 2 and an oxidant mixture stream 3 are provided into the furnace by means of burner 4 and lance 5 respectively. The oxidant mixture and fuel mix within the furnace and combust. The FIGURE also illustrates a premixed embodiment wherein oxidant mixture and fuel are combined in premixed burner or cavity and passed as a mixture 7 into furnace or combustion zone 1 wherein they further mix and combust. In actual practice, only one mode of operation would generally be used. The resulting combustion reaction generates heat and combustion reaction products such as carbon dioxide and water vapor. The heat may be used to heat and/or melt the charge. In the FIGURE the charge 8 is molten glass and glass forming materials which pass through the furnace underneath the combustion reactions. The combustion reaction products are passed out of the furnace through exhaust port 9.

The invention may also be practiced by adding argon directly to the fuel instead of or in addition to employing the defined oxidant mixture. The argon may be added to the fuel within the combustion zone or before the fuel is injected into the combustion zone. This practice of the invention may be defined as:

A method for carrying out combustion comprising:
(A) establishing a mixture of fuel and argon within a combustion zone;
(B) providing oxidant at a low velocity into the combustion zone separately from said mixture of fuel and argon;
(C) mixing said mixture of fuel and argon with said oxidant within the combustion zone; and
(D) combusting said fuel with said oxidant within the combustion zone.

Although the invention has been described in detail with reference to certain preferred embodiments, those skilled in the art will recognize that there are other embodiments of the invention within the spirit and the scope of the claims.

I claim:

1. A method for carrying out combustion comprising:
(A) providing fuel into a combustion zone;
(B) providing oxidant mixture together with the fuel into the combustion zone at low velocity within the range of from 25 to 425 feet per second, said oxidant mixture comprising from 28 to 96 volume percent oxygen, from 2 to 70 volume percent argon and from 2 to 60 percent nitrogen;
(C) mixing said fuel and said oxidant mixture within the combustion zone; and
(D) combusting said fuel and said oxygen within the combustion zone.

2. The method of claim 1 wherein the oxidant mixture has an argon concentration within the range of from 3 to 20 volume percent.

3. The method of claim 1 wherein the oxidant mixture has an argon concentration within the range of from 3 to 10 volume percent.

4. The method of claim 1 wherein the combustion zone contains a charge.

5. The method of claim 1 wherein the charge comprises glass.

6. The method of claim 1 wherein the said low velocity is within the range of from 25 to 325 feet per second.

7. The method of claim 1 wherein the minimum oxidant mixture velocity is calculated by the formula:

$$V_{min} = 50 fps \times 100/(100+1.25A)$$

where A is the concentration of argon in the oxidant mixture.

8. A method of carrying out combustion comprising:
   (A) establishing a mixture of fuel and argon within a combustion zone;
   (B) providing oxidant at a low velocity into the combustion zone separately from said mixture of fuel and argon;
   (C) mixing said mixture of fuel and argon with said oxidant within the combustion zone; and
   (D) combusting said fuel with said oxidant within the combustion zone.

9. The method of claim 8 wherein the said low velocity is within the range of from 25 to 425 feet per second.

10. The method of claim 8 wherein the said low velocity is within the range of from 25 to 325 feet per second.

11. The method of claim 8 wherein the mixture of fuel and argon is made outside the combustion zone and then provided into the combustion zone to establish the mixture of fuel and argon within the combustion zone.

12. The method of claim 8 wherein the fuel and argon are provided separately into the combustion zone and mixed therein to establish the mixture of fuel and argon within the combustion zone.

* * * * *